Inventors
Werner Baesgen, Herbert Domisky and
Otto Patzold
by Michaelis & Michaelis
Attys.

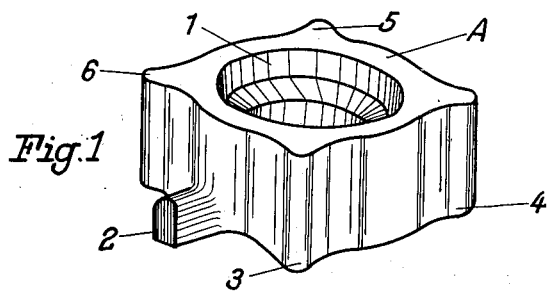
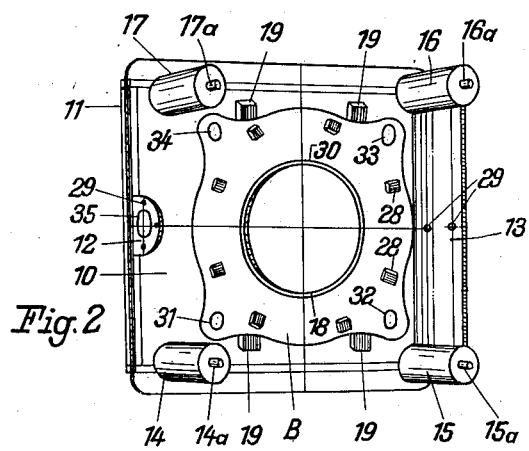
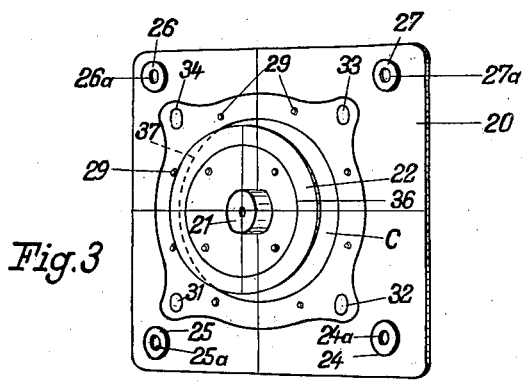

Patented May 28, 1940

2,202,683

UNITED STATES PATENT OFFICE 2,202,683

TESTING OF ACCURACY OF WORKPIECE DIMENSIONS

Werner Baesgen, Dessau, Herbert Demsky, Dessau-Sud, and Otto Pätzold, Dessau, Germany, assignors to Junkers Flugzeug-und-Motorenwerke Aktiengesellschaft, Dessau, Germany Application April 19, 1938, Serial No. 202,984
In Germany April 29, 1937

9 Claims. (Cl. 33—174)

Our invention relates to means for testing the form of half-finished products such as for instance castings, forgings and pressed parts, before they are machined. It has particular reference to means for testing the accuracy of the dimensions of such parts with the least possible expenditure of measuring work.

As is known to those skilled in the art, the accuracy of the dimensions of half-finished products of the kind mentioned above, which shall be subjected to a finishing treatment by drilling, turning, milling or the like, is commonly tested by ascertaining by way of a number of individual measurements carried out with the aid of suitable measuring instruments, whether the test piece possesses the prescribed outer dimensions and whether the necessary machining can be effected in the prescribed manner and with the required final dimensions. Obviously the carrying out of a plurality of such individual measurements is circumstantial and time-consuming, more especially in the case of parts produced on a quantity basis.

Our invention enables us to test the accuracy of the dimensions of half-finished products without requiring the circumstantial and expensive measuring work to be gone through. According to our invention the test piece is fixed in a templet containing tracings of the finished article, which correspond to the real article as regards position and size, this being done in such manner that the eye of the observer is able to ascertain any aberrations of the form and dimensions of the test piece relative to the finished piece.

In the drawings affixed to this specification and forming part thereof an embodiment of a testing device according to our invention is illustrated diagrammatically by way of example.

In the drawings:

Fig. 1 is a perspective view of a casting forming the test piece, the correct dimensions of which shall be tested.

Fig. 2 is a perspective view of one part and Fig. 3 a similar view of the other part constituting the templet arranged to accommodate therein the test piece.

Figure 4:
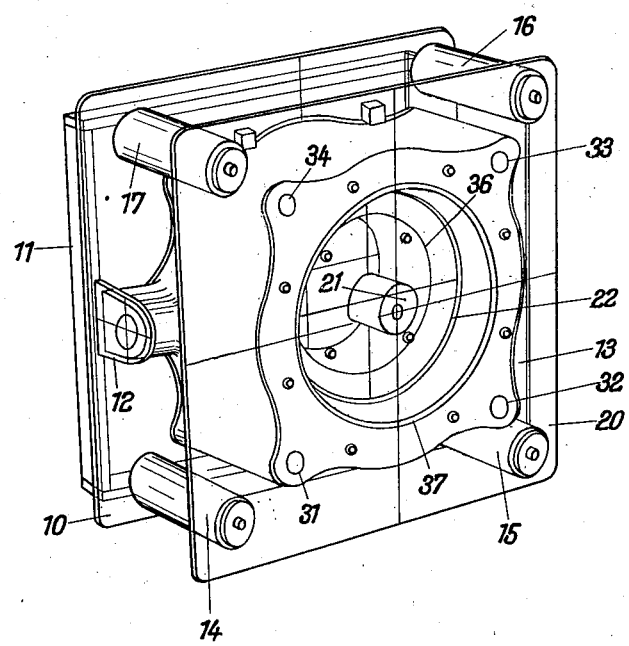
Fig. 4 illustrates the two parts shown in Figs. 2 and 3 in assembled condition and the test piece, shown in Fig. 1 inserted in the templet.
Figure 5:
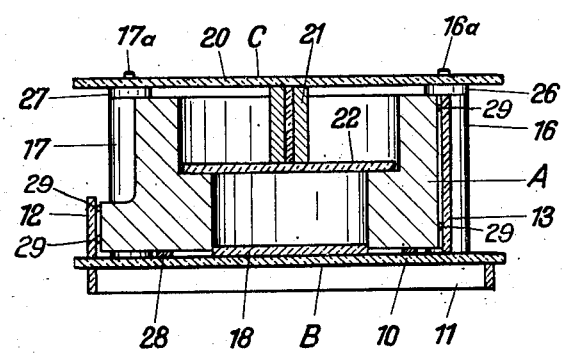
Fig. 5 is a cross section of the device illustrated in Fig. 4.

Referring to the drawings and first to Fig. 1, the casting A is formed with an axial bore 1, which is enlarged at about one-half the height of the body and which shall be finished by turning. The casting A is further formed with a lateral extension 2 intended to be traversed by a bore, and with supporting ribs 3, 4, 5, 6 through which holes shall be drilled extending in parallel to the middle axis, these holes being designed for the insertion of screw bolts.

The accuracy of the dimensions of the casting A is tested by means of a hollow templet consisting of the parts B (Fig. 2) and C (Fig. 3). The part B comprises a bottom plate 10 with reinforcing ribs 11, the side walls 12, 13 and four stay bolts 14, 15, 16, 17. The part C comprises a cover plate 20 and a disk 22 of circular contour, the diameter of which is smaller than the enlarged part of the bore 1 of the casting A. The disk 22 is mounted on the plate 20 by means of a stay bolt 21. On the cover plate 20 are fixed perforated check pieces 24, 25, 26, 27, which, when the parts B and C are assembled, abut against the end faces of the stay bolts 14, 15, 16, 17, the guide pins 14a, 15a, 16a, 17a fixed in the end faces of these bolts projecting into the perforations 24a, 25a, 26a, 27a of check pieces 24, 25, 26 and 27, respectively. In order to enable the test body A to be fixed in place on the part B, a disk 18 of circular contour is fixed on the bottom plate 10, this disk having the same diameter as the narrow part of the bore 1 of the test piece and projecting into this bore, when the test piece is mounted in position in the part B of the templet. There are further fixed on the bottom plate 10 blocks 19, which form abutments for the side walls of the test piece and serve to secure it against lateral displacement. On the walls 10, 12 and 13 of the part B, on the cover plate 20 and on the disk 22 mounted on this plate the contours of the casting A, after it has been machined to final shape, or middle lines indicating the parts to be machined, are drawn, for instance by tracing or scratching, in such manner, that on the test piece A being mounted in place in the templet B, C, any aberrations of the contours of the test piece from the contours of the finished piece, such as may be due for instance to an inaccurate mounting of cores in the casting mold, can easily be ascertained by the observer.

Thus for instance the bottom plate 10 shows a line 30 defining the contour of the narrow part of the bore 1 of the test piece A and the lines 31, 32, 33, 34 indicating the contour of the bores to be formed in the supporting ribs 3, 4, 5, 6. The wall 12 carries the line 35 which indicates the contour of the bore to be formed in the extension 2. In a similar manner the correct contour 27 of the enlarged part of the bore 1 is shown on the cover plate 20 together with the contours 31, 32, 33, 34 of the bores to be drilled through the supporting ribs 3, 4, 5, 6, while the disk 22 carries a line 36 being the contour of the narrow part of the bore 1.

Obviously with the aid of this templet it is easy to ascertain whether, after the bore 1 has been machined, the wall thickness of the test body A will still be sufficient, whether the bores in the supporting ribs, which are produced with the aid of a separate templet, will not deviate unduly from the middle axis, whether the extension 2 has the correct position etc. All this can be ascertained in a particularly simple and reliable manner, if the parts B and C, as indicated in the drawings, consist of a transparent material. Shatter-proof glass or artificial resin of glass-like transparency have been found to be particularly suitable for this purpose.

In order to prevent those parts of the wall, which carry the lines indicating the contours of the finished test piece, from being scratched when mounting the test piece in place in, and withdrawing it from, the templet, protective checks in the form of blocks 28 and knobs 29 are fixed on these parts. These checks are so designed that the surface of the test piece A, which is generally rough, can nowhere come in contact with the walls. To this end the blocks 28 are arranged on the bottom plate 10 in such manner that they keep the article A closely spaced from the plate 10. Thus, when a test-piece A is inserted into the templet, line 30 cannot be damaged, while the bore 1 can easily be compared with line 10. The knobs 29 are arranged at such points of the wall 13 which would otherwise contact with the outermost parts of the test-piece inserted into the templet. The blocks 28 and knobs 29 also secure the test-piece inserted into the templet against displacement.

Various changes may be made in the details disclosed in the foregoing specification without departing from the invention or sacrificing the advantages thereof.

We claim:

1. Device for testing the accuracy of the dimensions of half-finished products comprising in combination, a templet provided with walls and shaped to accommodate the test-piece between said walls, the walls carrying tracings of natural size of the parts, to be machined, of the test piece and extending in the same direction as, and in closely spaced relation to, such parts.

2. The device of claim 1, in which the walls consist of transparent material such as shatter-proof glass and have lines corresponding to the contours of the finished article arranged on the inner surfaces thereof.

3. Device for testing the accuracy of the dimensions of half-finished articles of manufacture comprising a hollow templet shaped to accommodate in its hollow space an accurate test-piece, the inner surfaces which delimit said hollow space, carrying tracings of natural size of the parts to be machined of the test-piece, so that these parts and said tracings appear in line when an accurate test-piece is placed in said templet.

4. Device for testing the accuracy of the dimensions of half-finished articles of manufacture comprising a hollow templet shaped to accommodate in its hollow space an accurate test-piece secured against displacement, the inner surfaces which delimit said hollow space, carrying tracings of natural size of the parts to be machined of the test-piece, so that these parts and said tracings appear in line when an accurate test-piece is placed in said templet.

5. The device of claim 1 in combination with guide pieces on the walls, which secure the test-piece placed in the templet against displacement.

6. The device of claim 1 in combination with checks on the walls, which prevent the test-pieces being introduced into or removed from said templet from directly contacting the walls carrying the tracings.

7. A device for testing prior to machining the accuracy of the dimensions of half-finished articles of manufacture, comprising a hollow templet including bottom, side and top walls adapted to enclose said article, means on one of said walls for securing said article against displacement, and protective checks on said walls for securing said article in a predetermined spaced relationship with respect to said walls, said walls being provided with tracings of natural size of the parts to be machined, whereby the accuracy of the dimensions of said article is ascertained by their conformity with said tracings.

8. The device of claim 1 in which at least one of the walls consists of transparent material.

9. A templet for testing the accuracy of the dimensions of partly finished products comprising in combination a plurality of wall panels, at least one of which consists of transparent material, means for releasably connecting said panels in a pre-determined arrangement about a test piece, and abutment members in connection with said panels to hold said test piece in a pre-determined relation thereto, said panels carrying tracings of natural size of the parts to be machined of the test piece so that the parts and the tracings appear in line when an accurate test piece is held by said abutment members.

WERNER BAESGEN.
HERBERT DEMSKY.
OTTO PÄTZOLD.